(12) United States Patent
Hondier

(10) Patent No.: US 8,336,911 B2
(45) Date of Patent: Dec. 25, 2012

(54) SAFETY ARRANGEMENT AND METHOD FOR THE PRODUCTION OF SUCH A SAFETY ARRANGEMENT

(75) Inventor: Thierry Hondier, Salmonville (FR)

(73) Assignee: Autoliv Development AB, Vargada (SE)

( * ) Notice: Subject to any disclaimer, the term of this patent is extended or adjusted under 35 U.S.C. 154(b) by 112 days.

(21) Appl. No.: 12/921,011

(22) PCT Filed: Jan. 26, 2009

(86) PCT No.: PCT/EP2009/000468
§ 371 (c)(1),
(2), (4) Date: Oct. 12, 2010

(87) PCT Pub. No.: WO2009/109265
PCT Pub. Date: Sep. 11, 2009

(65) Prior Publication Data
US 2011/0018239 A1    Jan. 27, 2011

(30) Foreign Application Priority Data
Mar. 7, 2008    (DE) .......................... 10 2008 013 526

(51) Int. Cl.
*B60R 21/16* (2006.01)
(52) U.S. Cl. ........................................ 280/731
(58) Field of Classification Search .................. 280/731, 280/728.2; 200/61.54
See application file for complete search history.

(56) References Cited

U.S. PATENT DOCUMENTS

| | | | | |
|---|---|---|---|---|
| 5,327,796 A | * | 7/1994 | Ernst et al. .................. | 74/484 H |
| 6,554,312 B2 | * | 4/2003 | Sakane et al. .............. | 280/728.2 |
| 6,568,702 B1 | * | 5/2003 | Ford ........................... | 280/728.2 |
| 7,533,897 B1 | * | 5/2009 | Xu et al. .................... | 280/728.2 |
| 7,789,415 B2 | * | 9/2010 | Groleau et al. ............. | 280/728.2 |
| 8,087,691 B2 | * | 1/2012 | Nebel et al. ................. | 280/731 |
| 2005/0017484 A1 | | 1/2005 | Worrell et al. | |
| 2006/0066082 A1 | * | 3/2006 | Tsujimoto et al. ............ | 280/731 |

FOREIGN PATENT DOCUMENTS

| | | |
|---|---|---|
| DE | 43 17 737 A1 | 12/1993 |
| DE | 42 27 931 | 2/1994 |
| DE | 200 17 527 U1 | 3/2001 |
| DE | 10 2005 002 945 A1 | 7/2006 |
| WO | WO 2006/076897 A1 | 7/2006 |
| WO | WO 2006/086163 A1 | 8/2006 |

OTHER PUBLICATIONS

PCT/EP2009/000468—International Search Report—May 11, 2009.

* cited by examiner

*Primary Examiner* — Faye M. Fleming
(74) *Attorney, Agent, or Firm* — Brinks Hofer Gilson & Lione

(57) ABSTRACT

The invention relates to a safety arrangement comprising a module support (1, 10) for an airbag module (2) and an airbag module (2) to be installed in a steering wheel in a vehicle with at least two first and second horn contacts (3, 3', 4) which are electrically isolated from one another in the installed state and can be electrically contact-connected to one another in the activation state in order to trigger an acoustic horn signal, with at least one of the first or second horn contacts comprising a plurality of horn contact sections (3, 3') and the airbag module (2) being electrically conductively connected to the horn contact sections (3, 3') when the airbag module is installed in order to complete the horn contact.

12 Claims, 4 Drawing Sheets

SAFETY ARRANGEMENT AND METHOD FOR THE PRODUCTION OF SUCH A SAFETY ARRANGEMENT

CROSS REFERENCE TO ELATED APPLICATIONS

This application claims priority to German patent application number 10 2008 013 526.7, filed Mar. 7, 2008 and PCT/EP2009/000468, filed Jan. 26, 2009.

FIELD OF THE INVENTION

The invention relates to a safety arrangement comprising a module support for an airbag unit and an airbag unit to be installed in a steering wheel in a motor vehicle, and to a method for producing a safety arrangement of this type.

BACKGROUND OF THE INVENTION

A safety arrangement of the above mentioned type is provided, in particular, for a driver-side airbag which is arranged within a steering wheel and is activated in order to protect a driver in the event of an accident or an imminent accident. A steering wheel of this type generally has two horn contacts which are electrically isolated from one another in the installed state and can be electrically contact-connected to one another in the activation state in order to trigger an acoustic horn signal. These horn contacts are fixed in the module support and can be electrically connected to one another by pressing on a pressure plate or switch.

WO2006/076897 A1 discloses a gas generator support for a driver's airbag module to be installed in a steering wheel of a motor vehicle, in which two horn contacts which can be electrically contact-connected to one another are arranged on the generator support. One of the horn contacts is intended to be electrically connected to earth (electrical ground) in the installed state of the generator support, with a fixing region of the generator support for fixing a gas generator being formed and positioned relative to the grounded horn contact such that electrical contact is established between the grounded horn contact and the gas generator when the gas generator is fixed to the fixing region as intended, with the generator support being in the form of an electrical insulator. In this case, the horn contacts are of U-shaped design and one is fixed on a side of the generator support facing a driver and one is fixed on a side of the generator support away from the driver. Deformation of the horn contacts when a pressure is exerted leads to the two horn contacts being electrically connected to one another, with the result that a horn signal is triggered.

The arrangement of the two horn contacts on opposite sides of the generator support, specifically one on the upper side and one on the lower side, is complicated.

The object of the present invention is to provide a safety arrangement and a method with which mounting of the safety arrangement can be simplified and a cost-effective safety arrangement can be provided. According to the invention, this object is achieved by a safety arrangement having the features and methods described and claimed herein. Advantageous refinements and developments of the invention are also described.

The safety arrangement according to this invention includes a module support for an airbag unit and an airbag unit to be installed in a steering wheel in vehicles with at least two horn contacts which are electrically isolated from one another in the installed state and can be electrically connected to one another in the activation state in order to trigger an acoustic horn signal. The arrangement provides for at least one of the horn contacts to comprise a plurality of horn contact sections and for the airbag unit to be electrically conductively connected to the horn contact sections in order to complete the horn contact. Horn contacts are electrically connected to one another by means of switches which are arranged at different locations on the module support; generally, three or four switches are arranged in a uniformly distributed manner, so that the horn contacts can be reliably contact-connected irrespective of where a pressure force is exerted on a pressure plate, for example a front closure of an impact absorber. In order to not provide all the switches with separate cabling, the horn contacts are formed as conductor tracks, so that cabling only has to be provided at a point with the horn contact in each case. If the switches then come into electrical contact both with the first and with the second horn contact, an acoustic horn signal is activated until said horn contacts are electrically isolated. According to the invention, provision is then made for the horn contacts to not connect all points of the switches to one another by means of electrical conductor tracks, but for horn contact sections which are in electrical contact with the airbag unit to be provided on the module support, so that the horn contact sections are completed to form a horn contact which electrically connects all the switch points or switches to one another. Therefore, by virtue of the installation of the airbag unit, an initially open horn contact comprising a plurality of horn contact sections, for example two or three horn contact sections, is closed, so that the two horn contact sections, which are now completed, are electrically connected to one another by activation of a switch, with the result that an acoustic horn signal can be triggered. This reduces costs for the horn contacts and integrates the airbag unit as an electrical conductor element, with the result that functions are integrated.

One development of the invention makes provision for the airbag unit to have a gas generator and an airbag which can be arranged jointly on the module support as part of a steering wheel. In this case, the airbag can be accommodated in a container or a casing, it also being possible for the airbag container or the casing to establish electrical contact with the horn contact sections. As an alternative to this, provision is made for the horn contact sections to be connected to one another by means of the gas generator; a horn contact may optionally be completed by an airbag container, given corresponding electrical isolation between the airbag container and gas generator, while the other horn contact is completed by means of the gas generator. It is also possible for the two horn contacts to comprise a plurality of horn contact sections which are completed by the airbag unit being mounted.

Another development of the invention makes provision for the horn contacts to be arranged on the same side of the module support, that is to say either on the side of the module support facing the driver or on the side of the module support facing away from the driver. In this case, the two horn contacts and the horn contact sections point in the same direction, provided that they are arranged on a flat surface of the module support. The horn contacts can be arranged next to one another on the module support at least in regions, so that substantially parallel conductor tracks are formed on the module support by the horn contacts or horn contact sections.

The airbag unit and the gas generator or the airbag container can be tightly screwed or clipped onto the module support in order to ensure permanent fixing and reliable electrical contact-connection to the horn contact sections.

One development of the invention makes provision for the airbag unit and, in the process, in particular the gas generator to be connected to ground by means of one of the horn contacts in order to prevent electrostatic charging which could lead to unintentional triggering of the gas generator and therefore to unintentional deployment of the airbag.

In order to establish electrical contact between the horn contacts, pressure-operated switches, preferably spring-loaded pressure-operated switches, which can be electrically connected both to one and to the other horn contact, are fixed to the module support. As soon as the two horn contacts are electrically connected to the switch, the horn circuit is closed, so that the horn is activated, with the result that an acoustic horn signal is generated. In this case, the pressure-operated switches are preferably spring-loaded in a manner oriented in the direction of the driver, so that a pressure force has to be exerted in the direction of the steering wheel and the module support in order to electrically connect the horn contacts to one another.

The horn contacts or horn contact sections preferably comprise metal strips or other strips of conductive material, which strips are inserted, preferably integrally formed or injection-moulded, into the module support. Other ways of fixing horn contacts or horn contact sections are possible, for example plugging-in and clamping.

This invention further includes a method for producing a safety arrangement comprising a module support and an airbag unit which is fixed to said module support, in which method two horn contacts are arranged on the module support, makes provision for at least one of the two horn contacts to comprise a plurality of horn contact sections which are fixed to the module support such that they are electrically isolated from one another and are electrically connected to one another by the airbag unit being mounted. By virtue of mounting the airbag unit on the module support, two or more horn contact sections are connected to one another, so that the at least two horn contacts are completed, with the completed horn contacts being electrically isolated from one another in the normal state, that is to say without activation of the horn.

The horn contacts can be clamped or injection-moulded into the module support, with a particularly advantageous variant of the method involving the two contacts initially being of integral design, for example punched out from a sheet-metal blank, and predetermined breaking points being formed between the horn contact sections and the horn contact. Therefore, the two horn contacts or the horn contact and the horn contact sections are initially electrically connected to one another, with this electrical connection being broken at the predetermined breaking points by the predetermined breaking points being broken, with the result that the horn contact sections are electrically isolated from the horn contact. This has the advantage that only one part has to be inserted into an injection-molding die when the horn contacts or horn contact sections are joined to the module support in an injection-moulding process. The electrical bridges along the predetermined breaking points are then removed, so that horn contacts which are electrically isolated from one another or a horn contact and horn contact sections or horn contact sections are formed for two horn contacts which are first closed to form complete horn contacts by the gas generator or an airbag container or the airbag unit being mounted.

BRIEF DESCRIPTION OF THE DRAWINGS

Exemplary embodiments of the invention are explained in greater detail below with reference to the attached figures. Identical reference symbols in different figures denote identical or similar components. In the drawing.

DETAILED DESCRIPTION OF THE INVENTION

Figure 1:
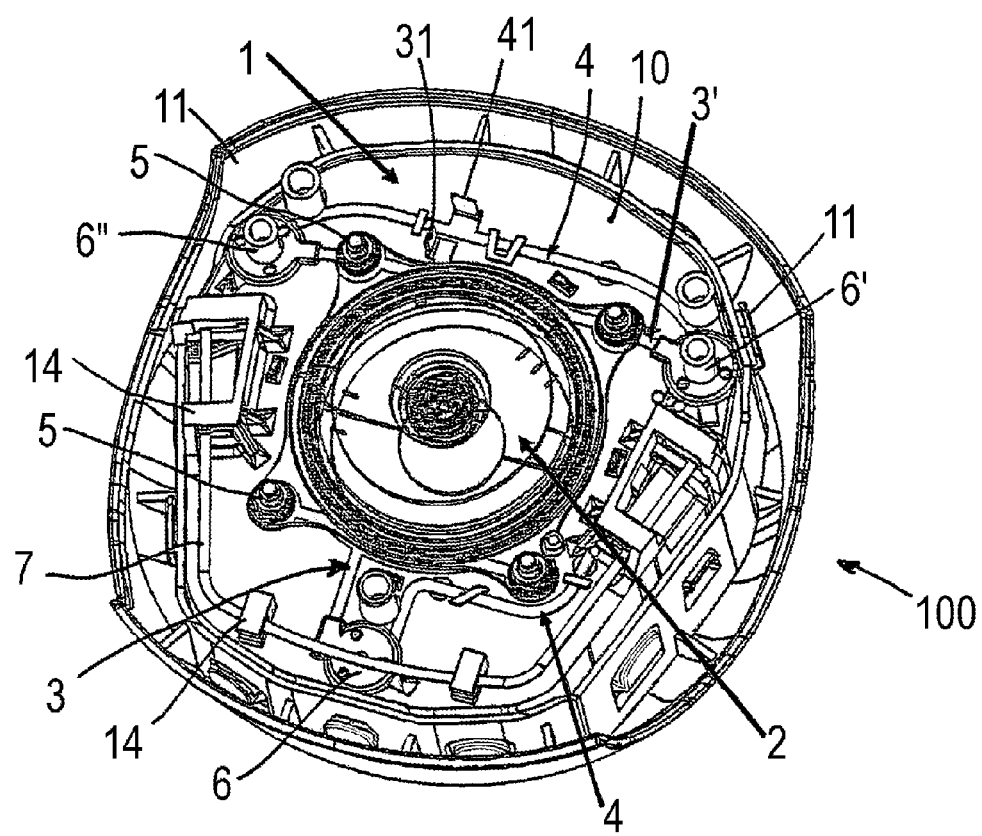
FIG. 1 shows a view, from below, of a module support with a mounted gas generator.
Figure 3:
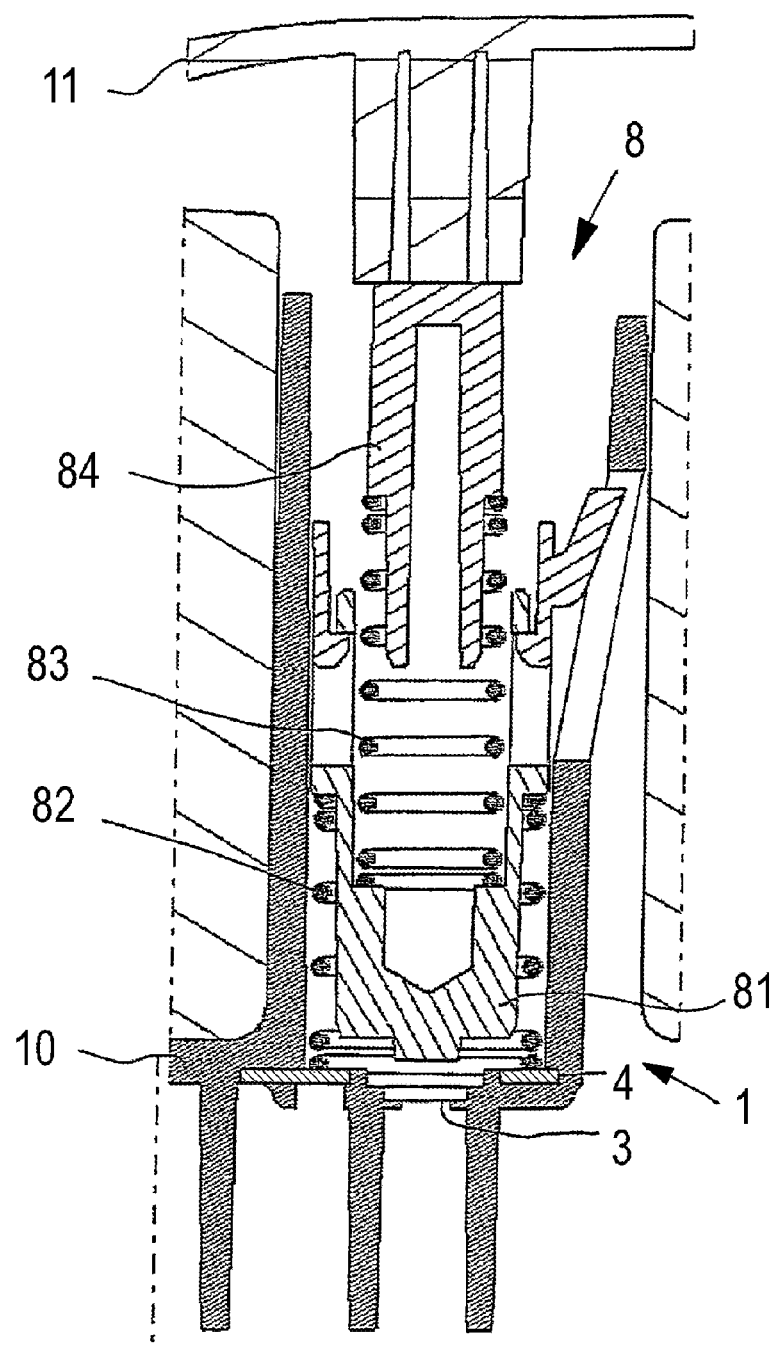
FIG. 3 shows a separate illustration of a switch.

FIG. 1 shows a view, from below, of a module support 1 in the form of a plate which has a base plane 10 and, on the side facing the driver, is covered by a covering cap 11 whose side walls point downwards and beneath which an airbag (not illustrated) is accommodated in a collapsed form. A gas generator 2, as part of an airbag unit, is fixed on the base plane 10 by means of screws 5. The gas generator 2 is illustrated so as to be partially transparent, so that first horn contacts 3 and 3' and a second horn contacts 4 which are likewise arranged on the base plate 10 are visible. The first horn contact (3, 3'), which runs in the immediate vicinity of the gas generator 2, comprises two separated horn contact sections 3 and 3' which are fixed, for example being plugged-in, clamped-in, adhesively bonded or injection-moulded, on the base plate 10. The module support 1 is preferably produced from a plastic material using an injection-moulding process. The first horn contact sections 3 and 3' are electrically isolated from one another (when gas generator 2 is not installed), with one of the first horn contact sections 3 ending in a first contact region 6 in which a pressure-operated switch, which will be explained below, is arranged. From there, the first horn contact section 3 extends in a T-shaped manner in the direction of the gas generator 2, where its end regions surround the screw receptacles 5 of the gas generator 2. Another first horn contact section 3' extends between the two other contact regions 6' and 6" on the opposite side of the first contact region 6 and is of substantially rectilinear design, with the screw bolt regions 5 of the gas generator 2 also being surrounded here. A second horn contact 4 extends from a first contact region 6, via another second contact section 6', to still another second contact region 6" outside the first horn contacts 3 and 3'. The second horn contact 4 is likewise in the form of an electrically conductive track, for example a metal rail or the like, and is secured to the base plane 10 on the same side as the horn contacts 3 and 3'. In the second contact regions 6, 6' and 6", the first and second horn contacts 3, 3' and 4 are likewise electrically isolated from one another and can be electrically coupled to one another by means of switches 8 which are shown in FIG. 3.

The first horn contact sections 3 and 3' are electrically isolated from one another and become electrically connected to one another by means of the gas generator 2 which is of electrically conductive design on the side facing the first horn contact sections 3 and 3' at least in regions or has an electrical conductor track, so that an electrically conductive connection can likewise be established to the contact region 6" via the contact region 6, the first horn contact section 3, the gas generator 2, the second contact region 6' and the first horn contact section 3'. Connection between first contacts 3 and 3' is therefore completed by the gas generator 2 being fixed on the base plane 10. In this case, the first and second horn contacts 3, 3' and 4 are arranged on the rear side of the base plane 10 of the module support 1, whereas the switches 8 are arranged on the opposite side and are covered, together with the airbag (not illustrated), by the covering cap 11. As an alternative, it is possible for electrical conductors to lead from the contact regions 6, 6' and 6" to the gas generator and be electrically coupled to one another by means of the said gas generator, so that a plug receptacle for an electrical connection to the horn has to be provided only in one of the contact regions 6, 6' and 6", with the result that the horn signal is triggered when any switch 8 is operated.

The gas generator 2 is placed on the lower side of the base plane 10 of the module support 1 and fixed by means of the screws 5; alternative fixing means, for example clip connections or clamping connections, are possible. The cover 11 is held by means of hook elements 13 which are formed on the module support 1. The ability of the cover 11 to move in the direction of the base plane 10 in a spring-loaded manner is ensured.

A spring rod 7 is clamped into receptacles 14 and can be used for securing to the steering wheel.

FIG. 1 also shows that plug connections 31 and 41 for an electrical contact connection are provided, with the plug receptacle 41 representing the connection to the horn, while the plug receptacle 31 simultaneously provides a connection to ground. The arrangement of FIG. 1 shows that the gas generator 2 and therefore the entire airbag unit are simultaneously connected to ground by means of the electrically conductive connection of the first horn contact sections 3 and 3' by means of the electrically conductive side of the gas generator 2 or an electrically conductive section of the gas generator 2 and the arrangement of the connection to ground by means of the plug connection 31, so that there is no static charging and there is no risk of voltage peaks and unintentional triggering of the gas generator 2.

The entire safety device 100 according to FIG. 1 can be in the form of an airbag module and be delivered having already been completely fitted with the module support 1, gas generator 2, airbag and cover 11 such that it is ready to be installed for final assembly of the steering wheel. In this case, a receptacle or a container for the airbag can be provided on the module support on the side facing the driver, for example in the form of side walls or retaining lugs over which the cover 11 is arranged in order to form a closed container for the collapsed airbag. The airbag unit generally has a gas generator 2 and an airbag which are secured to the module support 1. The airbag unit can have further elements, for example diffusers, deflectors, gas lines or holding devices for the airbag, in order to keep the airbag in the desired form. In this case, other components of the airbag unit, in addition to the gas generator 2, can also electrically contact-connect the switches 8 and the first horn contact sections 3 and 3' to one another.

Figure 2:
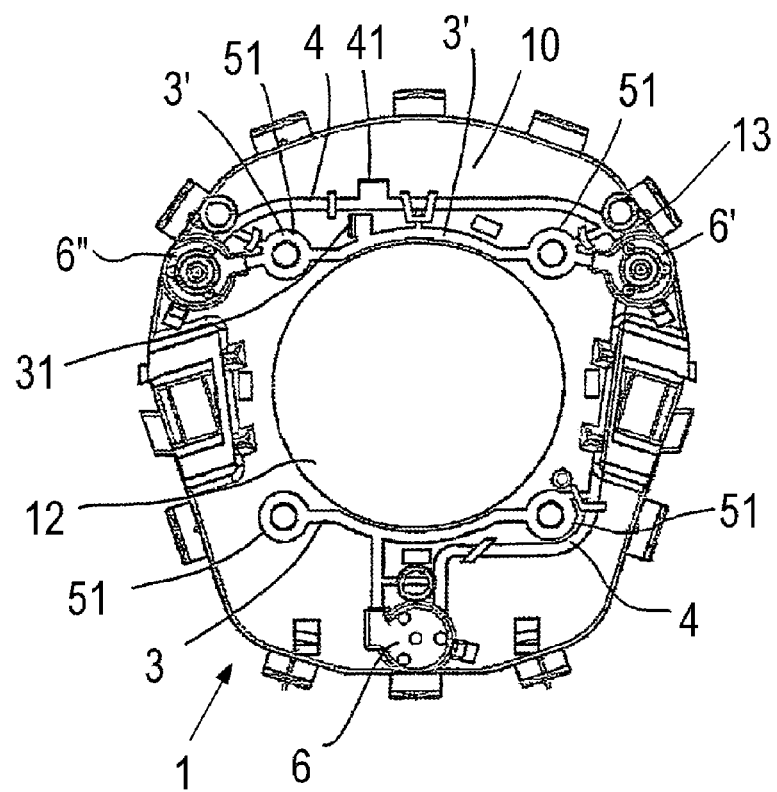
FIG. 2 shows the plan view of a module support without a gas generator.

FIG. 2 shows a plan view of a drawing of the base plane 10 of the support module 1, which shows that the continuous second horn contact 4 is arranged outside the first horn contact sections 3 and 3'. The passage holes for the screw bolts 5 are surrounded by horn contact section regions 51 and, in particular there, establish an electrical connection to the gas generator 2 (not illustrated and not mounted) in the mounted state. The module support 1 has formed in the base plane 10 a recess 12 through which the folded airbag is pushed to the front of the module support 1, so that the airbag can be deployed in the direction of the driver. The gas generator 2 is larger than the recess 12 and cannot pass through.

Fastening hooks 13 for fixing the covering cap 11 (not illustrated) protrude from the sides of the base plane 10. The switches 8, which are illustrated in FIG. 3, are mounted on the side of the module support 1 facing the driver, whereas the two first horn sections 3, 3' and second contacts 4 are arranged on the side of the module support 1 facing away from the driver. As an alternative, the first and second horn contacts 3, 3' and 4 can also be arranged on the side of the module support 1 facing the driver if the contact regions 6 and the switches 8 are of corresponding configuration.

FIG. 3 shows a sectional illustration through a switch 8 in a mounted state. The switch 8 is fixed to the base plane 10 of the module support. The first horn contacts 3 and the second horn contact 4 are electrically isolated from one another. The switch 8, which is acted on by a prestressing force by means of two springs 82 and 83 in a direction away from the first horn contacts 3, 3' and second horn contact 4, is arranged on the side of the module support 1 facing the driver. A receptacle cap 84, on which the cover 11 which likewise covers the airbag (not illustrated) is fixed, is arranged at that end of the switch 8 which is averted from the horn contacts 3 and 4. The receptacle cap 84 is spring-loaded in relation to a contact element 81 by means of a centrally arranged spring 83. The contact element 81, in turn, is surrounded by a prestressed compression spring 82 and is pushed away from the horn contacts 3 and 4. If a pressure force is exerted downwards, from above, on the receptacle cap 84 by the cover, a force is exerted on the contact element 81, and this in turn causes compression of the outer compression spring 82. If the force is large enough, the contact element 81 is electrically conductively connected both to the outer positioned second horn contact 4 and to the inner positioned first horn contact 3 and 3' at the end of the movement. As soon as this is the case, the circuit is closed and the horn (not illustrated) is activated. As soon as the pressure force is removed, the contact part 81 returns to the normal or starting position illustrated.

Figure 4:
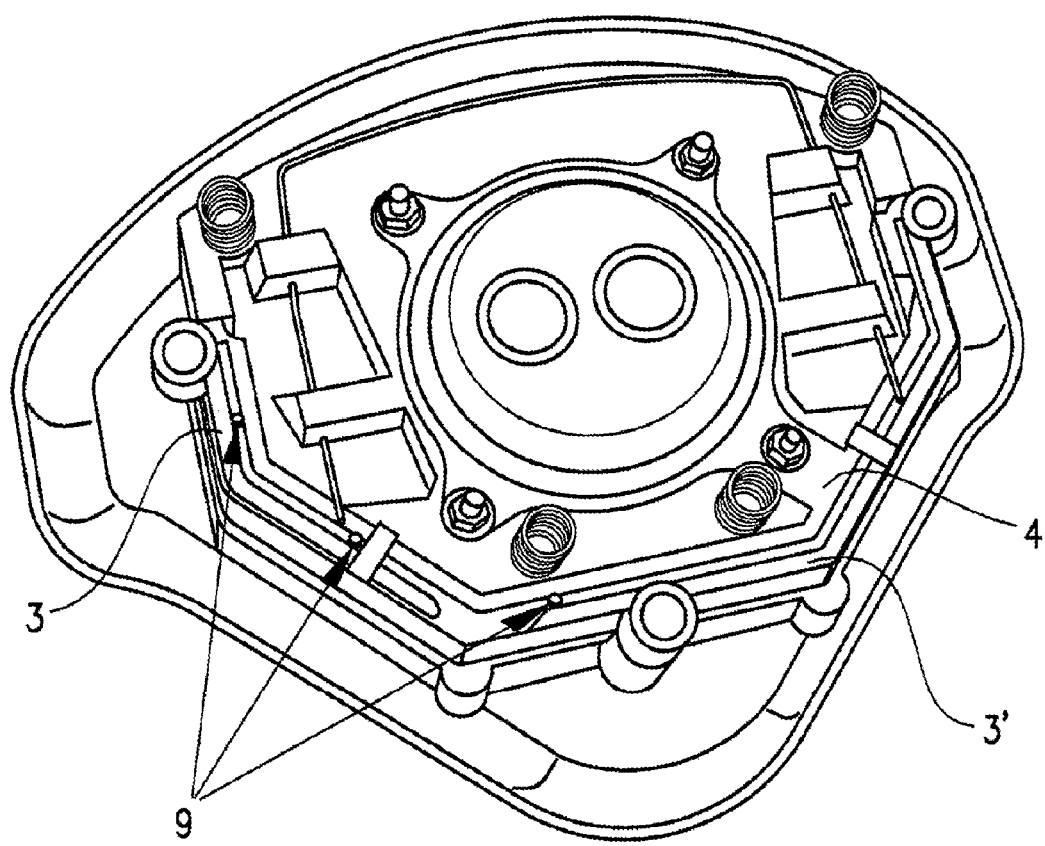
FIG. 4 shows a plan view of a variant according to FIG. 2.

FIG. 4 illustrates a variant of FIG. 2, in which the second horn contacts 4 and first horn contact sections 3 and 3' are initially of integral design and are connected to one another by means of contact bridges 9 having predetermined breaking points. This has the advantage that the initially integral first and second horn contacts 3, 3' and 4 can be jointly inserted into an injection mould as one component and then held by the plastic material of the module support 1, so that the electrical conductor tracks are arranged on the lower side or upper side of the base plane 10 of the module support 1, depending on design. After the horn contacts 3, 3' and 4 are shaped or injected-moulded, the conductor bridges 9 are broken at the predetermined breaking points and the electrical connection is interrupted.

While the above description constitutes the preferred embodiment of the present invention, it will be appreciated that the invention is susceptible to modification, variation, and change without departing from the proper scope and fair meaning of the accompanying claims.

The invention claimed is:

1. A safety arrangement comprising a module support for an airbag unit and an airbag unit having an airbag and a gas generator, the airbag unit to be installed in a steering wheel in a vehicle with a first horn contact formed of at least two first horn contact sections and with a second horn contact, the first and second horn contacts are electrically isolated from one another in the normal state and can be electrically contact-connected to one another in the activation state in order to trigger an acoustic horn signal, the first horn contact sections being electrically insulated from one another prior to installation of the airbag unit which is electrically conductively connected to the first horn contact sections upon installation of the airbag unit, the first horn contact sections being electrically connected to one another via the gas generator.

2. The safety arrangement according to claim 1 further comprising that the first horn contact sections are connected to one another by means of a further component of the airbag unit in the form of one or more of a container, a diffuser or a deflector of the gas generator.

3. The safety arrangement according to claim 1 further comprising that electrically conductive material webs of the gas generator connect the first horn contact sections (3, 3') to one another.

4. The safety arrangement according to claim 1 further comprising that the first horn contact sections and the second horn contact are arranged on the same side of the module support.

5. The safety arrangement according to claim 1 further comprising that the first horn contact and the second horn contact are arranged next to one another on the module support.

6. The safety arrangement according to claim 1 further comprising that the airbag unit is tightly screwed or clipped onto the module support.

7. The safety arrangement according to claim 1 further comprising that a gas generator of the airbag unit is connected to ground by means of one of the first and second horn contacts.

8. The safety arrangement according to claim 1 further comprising that pressure-operated switches, which electrically connect the first horn contact and the second horn contact to one another in order to generate an acoustic horn signal, are fixed to the module support.

9. The safety arrangement according to claim 1 further comprising that the sections of the first horn contact sections comprise metal strips which are integrally formed in the module support.

10. A method for producing a safety arrangement comprising providing a module support and providing an airbag unit with an airbag and a gas generator, fixing the airbag unit to the said module support, arranging first and second horn contacts on the module support, the first horn contacts comprises a plurality of first horn contact sections which are fixed to the module support such that they are electrically isolated from one another when the airbag unit is not installed into the module support, and the first horn contact sections becoming electrically connected to one another via the gas generator by mounting the airbag unit to the module support.

11. The method according to claim 10, further comprising that the first and second horn contacts are clamped or molded into the module support.

12. The method according to claim 10 further comprising the steps of providing the first and second horn contacts of integral design and having predetermined breaking points, breaking the horn contacts after the first and second horn contacts are fixed to the module support, in order to electrically isolate the first horn contact sections from the second horn contact.

* * * * *